(12) United States Patent
Takashima

(10) Patent No.: US 11,947,128 B2
(45) Date of Patent: Apr. 2, 2024

(54) DIGITAL ILLUMINATION ASSISTED GAZE TRACKING FOR AUGMENTED REALITY NEAR TO EYE DISPLAYS

(71) Applicant: Arizona Board of Regents on Behalf of the University of Arizona, Tucson, AZ (US)

(72) Inventor: Yuzuru Takashima, Tucson, AZ (US)

(73) Assignee: ARIZONA BOARD OF REGENTS ON BEHALF OF THE UNIVERSITY OF ARIZONA, Tucson, AZ (US)

( * ) Notice: Subject to any disclaimer, the term of this patent is extended or adjusted under 35 U.S.C. 154(b) by 64 days.

(21) Appl. No.: 17/760,599

(22) PCT Filed: Sep. 14, 2020

(86) PCT No.: PCT/US2020/050690
§ 371 (c)(1),
(2) Date: Mar. 15, 2022

(87) PCT Pub. No.: WO2021/051067
PCT Pub. Date: Mar. 18, 2021

(65) Prior Publication Data
US 2022/0350153 A1 Nov. 3, 2022

Related U.S. Application Data

(60) Provisional application No. 62/900,574, filed on Sep. 15, 2019.

(51) Int. Cl.
*G02B 27/01* (2006.01)
*G02B 6/42* (2006.01)
(Continued)

(52) U.S. Cl.
CPC ........... *G02B 27/0179* (2013.01); *G02B 6/42* (2013.01); *G02B 6/4204* (2013.01);
(Continued)

(58) Field of Classification Search
CPC ...................................................... G06F 3/013
See application file for complete search history.

(56) References Cited

U.S. PATENT DOCUMENTS 5,796,499 A 8/1998 Wenyon
10,963,103 B1 * 3/2021 Shahmohammadi .. G02B 27/14
(Continued)

OTHER PUBLICATIONS

Hellman, Brandon, et al. "Angular and spatial light modulation by single digital micromirror device for multi-image butput and nearly-doubled etendue." Optics Express, vol. 27, No. 15, Jul. 22, 2019, pp. 21477-21494 [online] <https://www.osapublishing.org/oe/fulltext.cfm?uri=OE-27-15-21477&id=415529>.
(Continued)

*Primary Examiner* — Nitin Patel
*Assistant Examiner* — Amen W Bogale
(74) *Attorney, Agent, or Firm* — George R. McGuire

(57) ABSTRACT

A gaze tracking platform for human-machine interface device, such as a wearable Augmented Reality Near-to-Eye Display. The gaze tracking method, digital illumination assisted analog feedback tracking employs neither auxiliary camera nor digital image processing of human eye image that confronts challenges in gaze tracking speed, power, cost and space. Instead, an analog-digital hybrid method to track the gaze inspired by the groove tracking method that is widely adopted for optical data storage systems. In the method, a digital micromirror device generates angular modulated and infrared illuminating beam. The cornea reflects the infrared light and a segmented photodiode detects the reflection while providing a feedback servo signal to the digital micromirror device controller. The feedback signal is integrated over a time provides the variation gaze. Moreover, infrared and angularly modulated illumination is time-multiplexed with information displayed in visible wavelength. In this manner, single display device
(Continued)

is dual used for information display and gaze tracking that benefits especially augmented reality devices in terms of achieving small device form factor.

14 Claims, 13 Drawing Sheets

(51) Int. Cl.
    *G02B 26/08*     (2006.01)
    *G06F 3/01*     (2006.01)
    *F21V 8/00*     (2006.01)

(52) U.S. Cl.
    CPC ....... *G02B 6/4298* (2013.01); *G02B 26/0833* (2013.01); *G02B 27/0172* (2013.01); *G06F 3/013* (2013.01); *G02B 6/0023* (2013.01); *G02B 6/005* (2013.01); *G02B 2027/0178* (2013.01); *G02B 2027/0187* (2013.01)

(56) References Cited

U.S. PATENT DOCUMENTS

| | | |
|---|---|---|
| 11,353,698 B1 * | 6/2022 | Sharma ................ G02B 26/103 |
| 2004/0066547 A1 | 4/2004 | Parker et al. |
| 2011/0075257 A1 | 3/2011 | Hua et al. |
| 2018/0246336 A1 * | 8/2018 | Greenberg ......... G02B 27/0176 |

OTHER PUBLICATIONS

International Search Report and Written Opinion of PCT/US2020/050690, filed Sep. 14, 2020. Search Report dated Feb. 22, 2021.

* cited by examiner

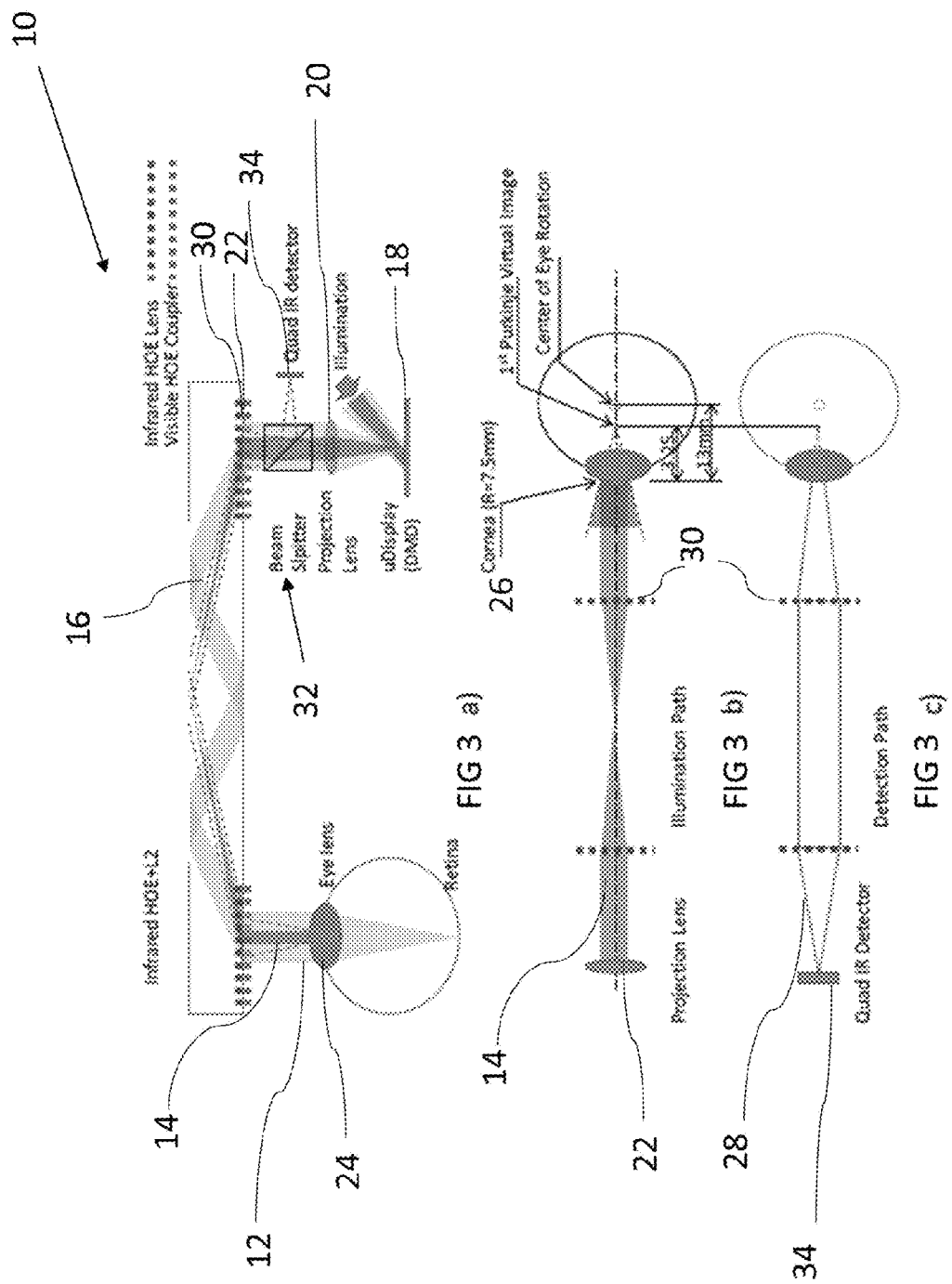

$$I_x = (A+B) - (C+D)$$
$$I_y = (A+D) - (B+C)$$

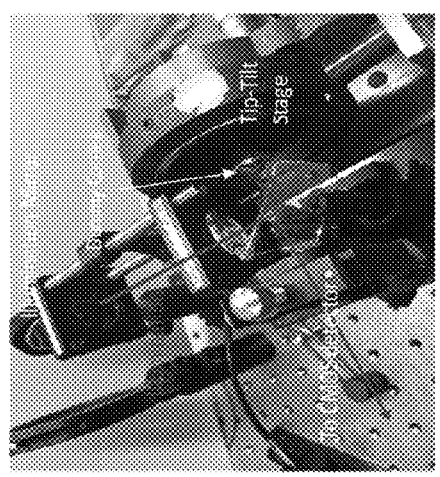
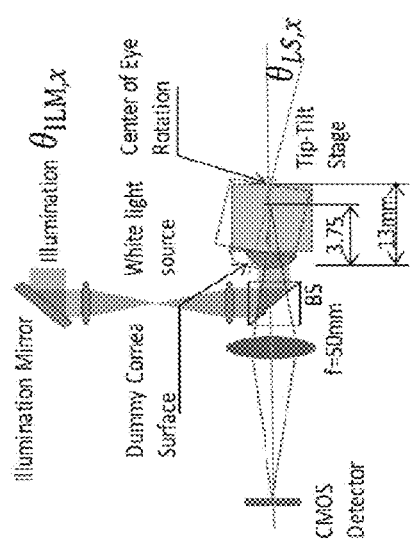
Fig 6(A)

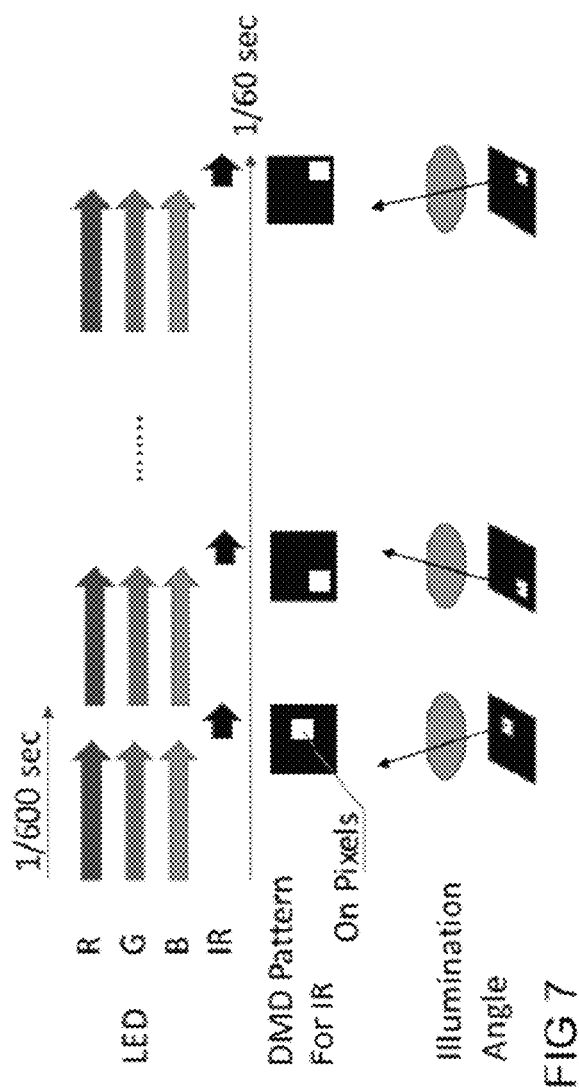

DIGITAL ILLUMINATION ASSISTED GAZE TRACKING FOR AUGMENTED REALITY NEAR TO EYE DISPLAYS

CROSS-REFERENCE TO RELATED APPLICATION

The present application relates and claims priority to U.S. Provisional Application No. 62/900,574 filed Sep. 15, 2019, the entirety of which is hereby incorporated by reference.

GOVERNMENT FUNDING

N/A

FIELD OF THE INVENTION

The present disclosure is directed generally to a gaze tracking method for a human-machine interface device, such as a wearable Augmented Reality Near-to-Eye Display.

BACKGROUND

Demand for gaze tracking for human-machine interface (HMI) devices such as a wearable Augmented Reality (AR) Near-to-Eye Display (NED) is increasing. The conventional digital gaze tracking method, such as camera-based detection confronts challenges in gaze tracking speed, power, and cost. Its size also prohibitive for personal and standalone HMI devices. Conventional analog detection of gaze, such as limbus detection is a simpler method however gaze detection accuracy is not satisfactory.

Analog detection of gaze, such as limbus detection is a simpler method while gaze detection accuracy is not satisfactory.

Based on the challenges of digital and analog gaze detection, the invention described an analog-digital hybrid method to track the gaze inspired by the groove tracking method that is widely adopted for optical data storage systems. In the method, a digital micromirror device (DMD) generates angular modulated and infrared (IR) illuminating beam. Cornea reflects the IR light and a segmented photodiode detects the reflection while providing a feedback servo signal to the DMD controller. The feedback signal is integrated over a time provides gaze. Moreover, IR and angularly modulated illumination is time-multiplexed with information displayed in visible wavelength. In this manner, single display device is dual used for information display and gaze tracking that benefits especially AR devices in terms of achieving small device form factor.

Consequently, the digital illumination assisted analog gaze detection is fundamentally different from conventional camera and digital image processing based gaze tracking in following aspects. It is high-speed (analog signal processing, no delay by digital image processing of image of human eye), low-power consumption (close to zero computational power needed thanks to the analog feedback loop), lower-cost and space effective (dual use of the display device for image projection and gaze tracking, no additional processor for digital image processing). Moreover, calibration process is integrated as a part of user practice of AR glass. We propose dual use of the micro display device and projection optics (holographic waveguide optics) for information display and gaze tracking purpose. This optical configuration automatically eliminates calibration process for gaze tracking because user adjusts the system to see the image well, which automatically calibrate detection optics. Preliminary a full field of view (FOV) of 40 degrees targeted. Additionally, the proposed method has a good affinity to recently demonstrated large field-of-view and high resolution image projection method, Angular Spatial Light Modulator (ASLM) as described later that potentially increases FOV of the gaze tracking beyond 40 degrees. The gaze tracking system potentially be in a smart glass employing holographic waveguide optics, and wide FOV Virtual Reality (VR) optics without substantial modifying optical architecture, nor employing camera for gaze tracking.

FIG. 1(A) shows a schematic of the image display optical system of SONY Smart Eyeglass Heads-UP Display (Model SED-E1). The optical system consists of LED, micro Display (uDisplay), projection lens and a holographic waveguide [https://developer.sony.com/develop/smarteyeglass-sed-e1/]. Images (navigation arrow) and text (navigation text) on the uDisplay device are projected onto the retina of the user (not shown) via a projection lens, total internal reflection inside holographic waveguide and human eye lens. In the optical system, the second hologram placed at the downstream of the optical system (output hologram) is half transparent and couples outside light to the human eye. In this coupling of the projected image to an outside image, the user observes a projected image and an outside image simultaneously (FIG. 1(B)).

When gaze tracking is implemented in a Smart Glasses device, a user can command the device by grazing menu bars such as "next" "prev" or even "jog" the virtual dial interface by gaze shown in FIG. 2(A). A user can select a menu option by blinking an eye, for example display "next" navigation information after s/he turns into Via Dei Mille. Gaze tracking would enhance the user's experience while being navigated. Along with brain-computer interfacing, gaze tracking is considered an effective technology for bi-directional communication between human and machine especially for patients who are suffering from diseases such as amyotrophic lateral sclerosis (ALS) [https://eyegaze.com/eye-tracking-technology-is-improving-lives-for-als-patients/]. The eye tracking technology is in field use for ALS patients as FIGS. 2(B) and 2(C) depict in a form of close to eye gaze tracker and display implemented gaze tracker.

As those examples indicate, a light weight and standalone smart display with gaze tracking based human computer interface (HCI) has a large impact for consumer, enterprise, and healthcare applications. Gaze tracking is also very effective to increase resolution of an image and field of view (FOV) of AR and Virtual Reality (VR) devices. Resolutions and FOV are expected to be close to the resolution and full FOV of the human eye, for example, <1 pixel/arcmin and >90 degrees, respectively. To achieve those requirements, a foveated image rendering and gaze tracking is considered as an effective solution while not overly increasing pixel counts of the display [Stengel M., Magnor M.: Gaze-contingent computational displays: Boosting perceptual fidelity. IEEE Signal Processing Magazine 33, 5 (2016), 139-148.].

If the gaze tracking system works for an AR display with a holographic image guide, it is also suitable for VR applications. The transparent holographic image guide does not interfere with the user to view displayed image while providing gaze information to the VR goggle device to increase resolution around center of the gaze.

Among electrical, mechanical, and optical eye tracking techniques, Photo or Video Oculo Graphy (VOG), or Pupil Center Corneal Reflection (PCCR) methods are adopted for gaze tracking. In VOG, an infrared (IR) light source illuminates the eye and the image of the eye is captured by an IR camera. The captured image contains two critical pieces of information, reflection of the IR light from the surface of the cornea (1st Purkinje reflection) and from other interior structures (2nd~4th Purkinje reflection), as well as the shape of the pupil. Depending on the gaze direction, the location of 1st Purkinje reflection and an (estimated) center of the pupil changes. The two pieces of information captured by the camera are used to estimate gaze direction. The PCCR method can be a glasses mounted type (FIG. 2(B)) or a screen-based device (FIG. 2(C)). In the glass mounted type, illumination and detection optics are mounted on eyeglasses whereas for screen-based device, optics are mounted inside the frame screen.

For AR/VR and healthcare applications, implementation has to be similar to the glasses mounted type or more ideally implemented as a part of the AR glasses. The gaze tracking camera and IR illumination depicted in FIG. 2(C) is remotely placed away from the user. This Remote Gaze Tracker (RGT) employing camera has a challenge in detecting gaze. First, movement of the head makes it difficult to use the 1st Purkinje reflection as a metric of gaze information. Therefore, usually secondary information, such as center of pupil or higher Purkinje reflections, are employed. However, for the gaze tracker implemented in AR glasses, this problem is worked around because head movement is not an issue.

In an near-to-eye gaze tracker, several systems have been proposed. Around the rim of eyeglasses, IR LEDs and photo detectors are mounted so that a variation of integrated reflectivity over the cornea and surrounding sclera is detected. Also, multiple IR LEDs and cameras are mounted in a similar way to the device depicted in FIG. 2(C). Instead of using a high-resolution single camera, multiple low-resolution cameras are employed but information captured by the low-resolution charge coupled devices are processed by a neural network to obtain gaze information. Alternatively, an auxiliary IR illumination optics and camera have been implemented in AR glasses. A light field detection by camera has also been proposed.

These conventional/proposed methods can be categorized as either analog gaze tracking employing photo detectors, or a camera based digital method. The analog tracking has the fundamental advantage of speed, but the gaze tracking accuracy is moderate. The camera based digital approach has better accuracy at the expense of a higher computational burden. As Nvidia indicates, "[a]augmented reality glasses introduce additional constraints in terms of power consumption and physical size of the tracking hardware. Reaching this goal requires more research on mobile, small-scale, low-power, robust and accurate eye-tracking technology."

SUMMARY

The present disclosure is directed to methods and systems for digital illumination assisted gaze tracking for augmented reality near to eye displays. Based on the challenges of digital and analog gaze detection, the technology is an analog-digital hybrid method to track the gaze is inspired by the groove tracking method that is widely adopted for optical data storage systems. In this method, a digital micromirror device (DMD) generates an angular modulated and IR illuminating beam. The cornea reflects the IR light and a segmented photodiode detects the reflection while providing a feedback servo signal to the DMD controller. The feedback signal is integrated over a time provides the variation of gaze. Moreover, IR and angularly modulated illumination is time-multiplexed with information displayed in visible wavelengths. In this manner, a single display device is dually used for information display and gaze tracking, that benefits AR devices in terms of achieving small device form factor.

Consequently, digital illumination assisted analog gaze detection is fundamentally different from conventional camera and digital image processing-based gaze tracking in following aspects. It is high-speed (analog signal processing, no delay by digital image processing of image of human eye), low-power consumption (close to zero computational power needed thanks to the analog feedback loop), lower-cost and space effective (dual use of the display device for image projection and gaze tracking, no additional processor for digital image processing). Moreover, the calibration process is integrated as a part of user practice of AR glass. Dual use of the micro display device and projection optics (holographic waveguide optics) for information display and gaze tracking purpose. This optical configuration automatically eliminates calibration process for gaze tracking because user adjusts the system to see the image well, which automatically calibrates detection optics. Preliminary a full field of view (FOV) of 40 degrees is targeted. Additionally, the method has a good affinity to recently demonstrated large field-of-view and high-resolution image projection method, Angular Spatial Light Modulator (ASLM) as described later that potentially increases FOV of the gaze tracking beyond 40 degrees. The gaze tracking system can potentially be in a smart glass employing holographic waveguide optics, and wide FOV Virtual Reality (VR) optics without substantial modification of optical architecture, nor employment of a camera for gaze tracking.

According to an aspect a process is provided having steps for image projection and gaze tracking, the steps comprising illuminating a digital micromirror device with an infrared light; generating an infrared illuminating beam using the digital micromirror device, the infrared illuminating beam having a modulated angle; reflecting the infrared illuminating beam off of a user's cornea; tracking a user's gaze by detecting the reflection of the infrared illuminating beam off of the user's cornea using a quad detector; providing a feedback signal to the digital micromirror device, wherein the feedback signal represents a overall variation of the user's gaze; adjusting the angle of the infrared illuminating beam based upon the feedback signal; integrating the feedback servo signal over a time; and time-multiplexing the infrared illuminating beam.

According to an embodiment, the angle of the infrared illuminating beam is adjusted by the digital micromirror device by turning on a pixel.

According to an embodiment, the process further comprises the step of collimating the infrared illuminating beam using a projection lens with holographic chromatic corrector.

According to an embodiment, the process further comprises the step of relaying the reflection of the infrared illuminating beam to the quad detector using at least one infrared holographic optical element lens.

According to an aspect, a process is provided having steps for image projection and gaze tracking, the steps comprising illuminating a digital micromirror device via a light source, wherein the digital micromirror device is a micro electro mechanical system having an array of micro mirrors; turning on and off the micro mirrors in a synchronous manner to the light source; forming a visible image by pulse width modulation of the micro mirrors, incorporating an infrared light emitting diode into the pulse width modulation; generating an infrared illuminating beam using the digital micromirror device, the infrared illuminating beam having a modulated angle; reflecting the infrared illuminating beam off of a user's cornea; tracking a user's gaze by detecting the reflection of the infrared illuminating beam off of the user's cornea using a quad detector; providing a feedback signal to the digital micromirror device, wherein the feedback signal represents the overall variation of the user's gaze; adjusting the angle of the infrared illuminating beam based upon the feedback signal; integrating the feedback servo signal over a time; and time-multiplexing the infrared illuminating beam.

According to an embodiment, the light source is a red green blue light emitting diode.

According to an embodiment, the process further comprises the step of combining the visible and infrared light using a dichroic beam splitter.

According to an embodiment, the process further comprises the step of: in and out-coupling the visible image using a holographic optical element coupler.

According to an embodiment, the micro mirrors can turn on and off approximately 190 times within 1/60 sec for 23 kHz frame rate.

According to an embodiment, the IR light source is collimated by the projection lens with holographic chromatic corrector that corrects the difference of focal length between visible and IR light.

According to an embodiment, the process further comprises the step of relaying the reflection of the infrared illuminating beam to the quad detector using at least one infrared holographic optical element lens.

According to an aspect, a digital illumination assisted gaze tracking for augmented reality near to eye display device is provided, comprising: a digital micromirror device having a controller; an illumination beam generated by the digital micromirror device along an optical path, having an angle of incidence; a quad detector being in communication with the digital micromirror device and positioned along the optical path such that it can receive a reflected illumination beam having a gaze angle; and a servomechanism controller in communication with the digital micromirror device controller, such that a feedback loop is formed wherein a signal is produced by the quad detector is sent to the digital micromirror device, wherein the digital micromirror device controller adjusts the angle of incidence.

According to an embodiment, the digital micromirror device is a micro electro mechanical system having an array of micro mirrors and pixels, wherein the angle of incidence is adjusted by turning on a pixel.

According to an embodiment, the digital micromirror device generates a visible image.

According to an embodiment, the device further comprises a projection lens with holographic chromatic corrector holographic chromatic corrector along the optical path.

According to an embodiment, the device further comprises a holographic optical element along the optical path.

According to an embodiment, the device further comprises a light emitting diode positioned to illuminate the digital micromirror device.

According to an embodiment, the device further comprises an infrared light source positioned to illuminate the digital micromirror device.

According to an embodiment, the device further comprises a dichroic beam splitter positioned between the infrared light source and the digital micromirror device.

These and other aspects of the invention will be apparent from the embodiments described below.

BRIEF DESCRIPTION OF THE DRAWINGS

The present invention will be more fully understood and appreciated by reading the following Detailed Description in conjunction with the accompanying drawings, in which:

FIG. 3(A) is a schematic cross-sectional view of the image display optical system, in accordance with an embodiment.

FIG. 3(B) is a schematic of illumination, in accordance with an embodiment.

FIG. 3(C) is a schematic of detection optical train, in accordance with an embodiment.

FIG. 6(A) shows an experimental set up. Reflection from lens surface (Cornea) is captured by a CMOS camera for $\theta\_(LS,y)=0$.

FIG. 7 shows dual use of DMD for information display and gaze tracking, in accordance with an embodiment.

FIG. 11(A) is a ray trace simulation of a gaze tracking system employing focused illumination and quad detector or position sensitive detector described in FIG. 9

DETAILED DESCRIPTION OF EMBODIMENTS

Figure 1B:
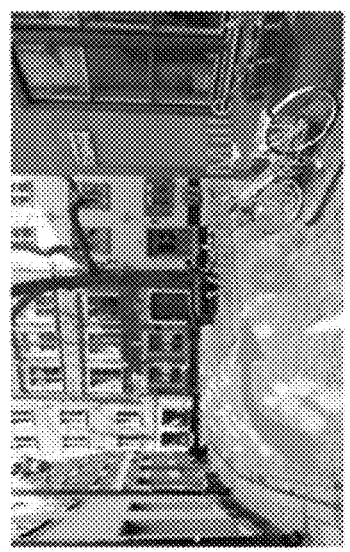
FIG. 1(B) an image showing how a projected image is superimposed on outside image of city.
Figure 1A:
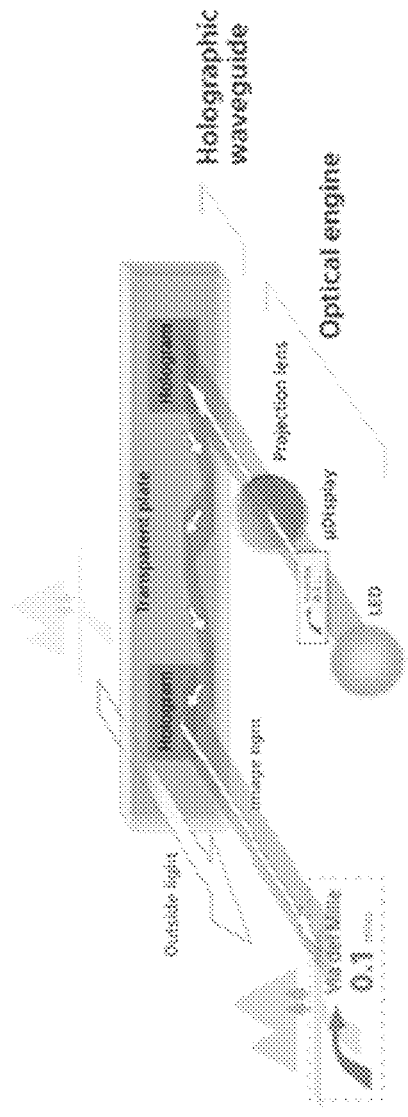
FIG. 1(A) is a schematic of the image display optical system of SONY Smart Eyeglass Heads-UP Display (Model SED-E1).
Figures 2A, 2B, 2C:
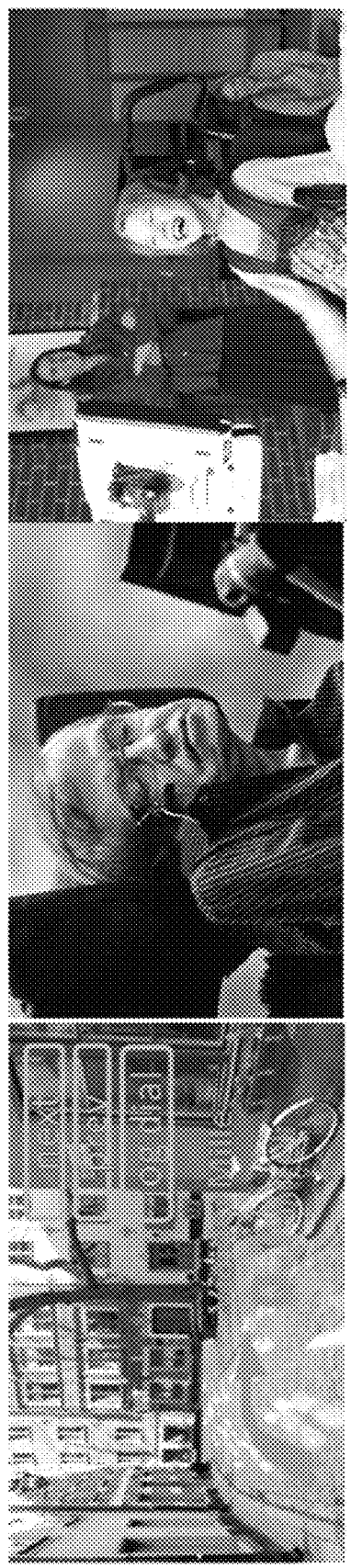
FIG. 2(A) is a concept of gaze based human machine interface.
FIG. 2(B) is a concept of gaze based human machine interface, in ALS patients using close to eye gaze tracker.
FIG. 2(C) is a concept of gaze based human machine interface, in ALS patients using a computer display with gaze tracking functionality.

The present disclosure describes digital illumination assisted gaze tracking for augmented reality near to eye displays.

According to an aspect is a method for image projection and gaze tracking, comprising the steps of individually turning on and off an array of micro mirrors in a synchronous manner to light sources; and forming a color image by Pulse Width Modulation (PWM) of the micro mirrors of DMD, the dual use of the DMD for information display and gaze tracking device, wherein red green blue (RGB) LEDs and an IR LED re used in the PWM.

In an aspect of the present invention, the optical method does not employ an additional camera for gaze tracking, but instead shares optics and a micro display device with the information projector.

A cross sectional schematic of the NED with proposed gaze tracking system 10 is depicted in FIG. 3. Three optical paths are shown, solid path 12 for displaying projected information, solid path 14 for illuminating the cornea, and doted path 16 for detecting the position of the virtual image formed by the surface of the cornea. The micro display, a DMD 18, is illuminated by converging visible light and IR light with a finite numerical aperture. The visible and IR light are combined by a dichroic beam splitter (not shown). The image bearing visible light is in and out-coupled by the visible Holographic Optical Element (HOE) coupler 20 (depicted as a dot line). In the visible domain, the DMD 18 and retina have object and image relation via the projection lens 22 and the eye lens 24.

The IR illumination path 14 illustrates DMD 18 with reference to FIGS. 3(A) and 3(B). A part of DMD 18 turns in a synchronous manner to the IR illumination. Since the duration of IR illumination is set to substantially short to the visible image, the visible image is not deteriorated. The time multiplexing of visible image and IR illumination makes dual use of the DMD 18 such that it eliminates the requirement of designated IR imaging optics and a camera for gaze tracking. The IR light source is collimated by the projection lens 20 with holographic chromatic corrector (not shown) that corrects the difference of focal length between visible and IR light. The collimated IR light illuminates the surface of the cornea 26 by relay optics, two IR holographic lenses. The IR holographic lens is a HOE having lens power and prism effect that focuses and bends IR light while in- and out-coupling the IR illumination light to and from the waveguide. The collimated IR light is reflected by the surface of the cornea 26 and generates a virtual image at about 3.75 mm away from the surface of the cornea 26. FIG. 3(C) shows the optical path 28 to detect the transverse position of the Purkinje Image. The virtual and reflected light is diverging. The diverging light is collimated by the IR-HOE lens 30 that in-couples light to waveguide. After the TIR, the second IR-HOE lens out-couples light while focusing it. The beam splitter 32 placed between the waveguide and projection lens folds the IR detection path to the quad IR detector 34. In the detection path, the virtual object by cornea 26 surface reflection (Purkinje image) is imaged on to the quad IR detector 34. The optical configuration is known as 4-f imaging optics. The 4-f imaging configuration relays a Purkinje image to the IR-quad detector 34 while relaying exit pupil of the projection lens 20 to the surface of cornea 26 to avoid beam walk while employing gaze tracking as described below.

Gaze Tracking Servo Principle

Figure 4:
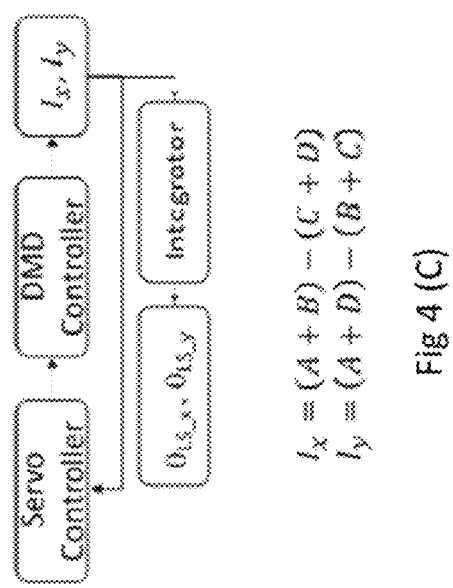
FIG. 4(A) is a Spot of Purkinje image on a quad detector when gaze is off, in accordance with an embodiment.
FIG. 4(B) is a Spot of Purkinje image on a quad detector when illumination angle is adjusted; The quad detector A, B, C, and D generates signal spot, in accordance with an embodiment.
FIG. 4(C) is a block diagram of servo loop, in accordance with an embodiment.
Figure 4:
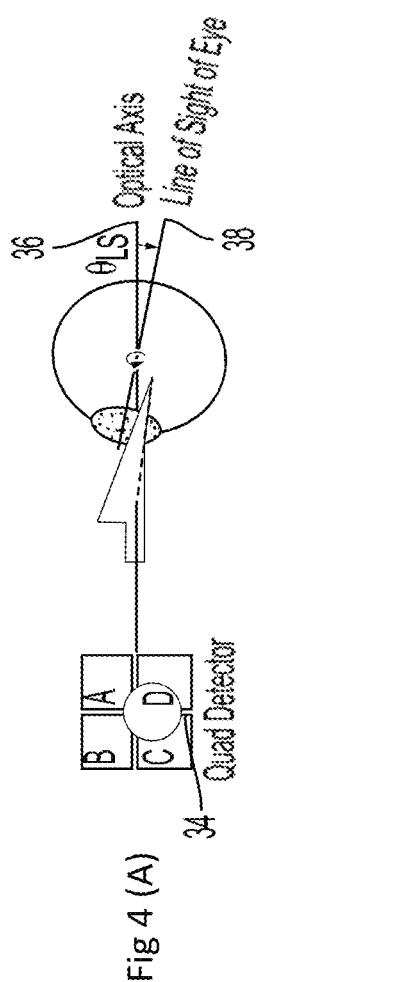
Figure 4:
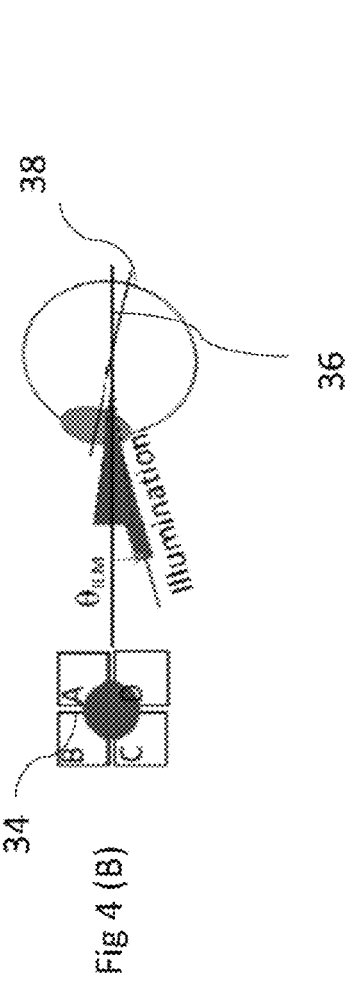

FIG. 4 shows the principle of the gaze tracking operation. Upon variation of gaze, the angle ($\theta$LS) between optical axis 36 and line of sight 38 occurs is the physical rotation angle of the eye. The center of the eye rotation occurs about 13 mm measured from the surface of the cornea. Whereas, the Purkinje image is formed at about 3.75 mm since the radius of the curvature of the $1^{st}$ surface of the cornea is about 7.5 mm. The difference between the position of the Purkinje image and center of the rotation of eye shifts the image perpendicular to the optical axis as depicted in FIG. 4(A). Accordingly, on the quad detector 34, image position shifts since the quad detector 34 is placed at the image location. FIG. 4A depicts the spot location on the quad detector 34 when gaze angle $\theta_{LS} \neq 0$. The gaze change shifts the Purkinje image. Consequently, the conjugate image on the quad detector 34 shifts in accordance with change of the gaze. The shift of the image on the quad detector 34 of Purkinje image is corrected by changing angle of incidence of the illumination $\theta_{ILM}$.

Change in the angle of incidence moves the Purkinje image to the optical axis, thus the spot on the quad detector 34 is centered as depicted in FIG. 4(B). The operation is carried out in real time by forming a feedback loop depicted in FIG. 4(C). The quad detector 34 generates signal $I_x=(A+B)-(C+D)$ and $I_y=(A+D)-(B+C)$. The signal $I_x$ and $I_y$ indicates the shift of light of sight in vertical and horizontal directions, respectively.

Based on the signals $I_x$ and $I_y$ the DMD driver turns on pixels so that the illumination angle changes to move the detector spot to keep signals $I_x$ and $I_y$ as zero. Thus, the DMD 18 and projection lens digitally steer IR light and changes angle of incidence (AOI) of the IR beam on the cornea by selecting corresponding pixels of the DMD 18. The feedback signals $I_x$, and $I_y$ are integrated that provides overall variation of the gaze ($\theta_{LS,x},\theta_{LS,y}$). Since the IR illumination is time multiplexed to visible image, a sample hold function (now shown in FIG. 4(C)) is employed in the servo loop.

Verification of Principle by Ray Trace Modeling and Experiment

Figure 5:
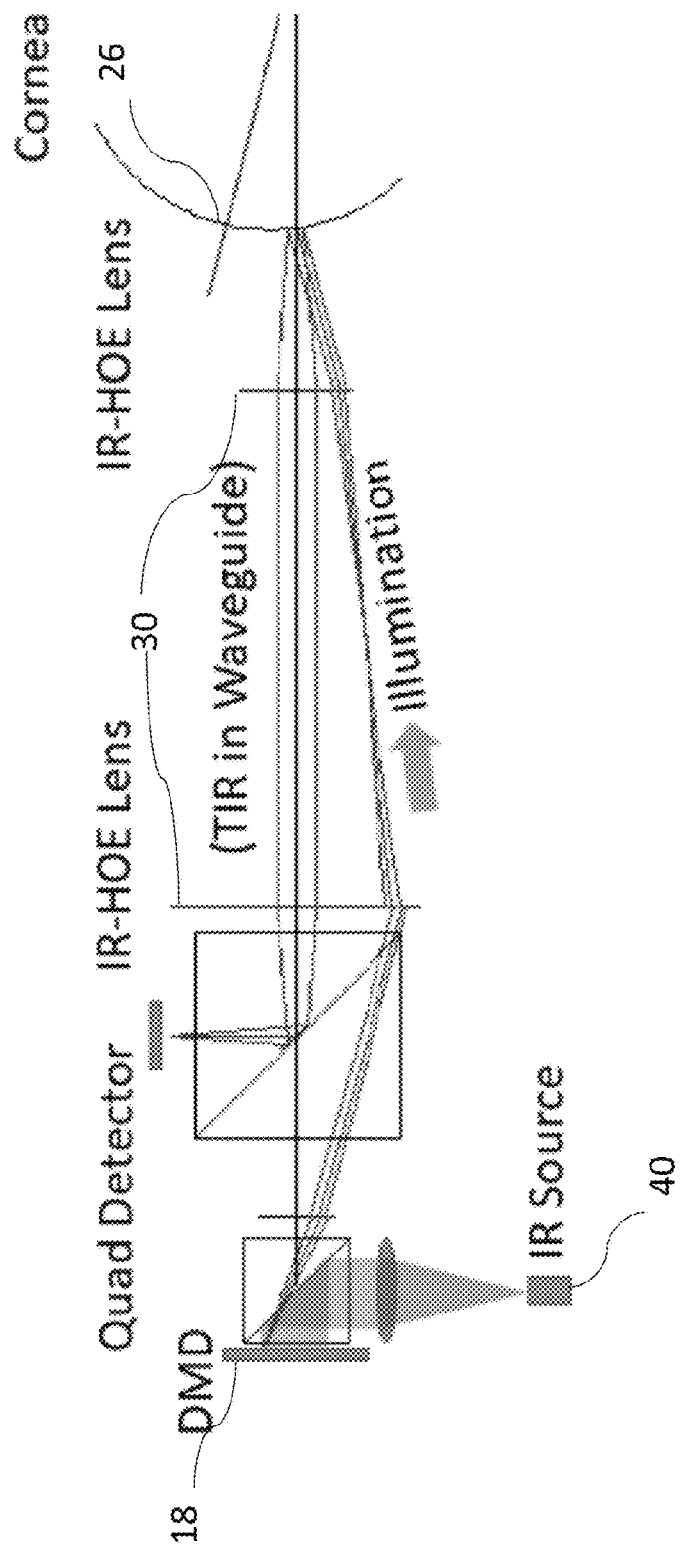
FIG. 5 is a ray trace diagram of proposed eye tracking servo optics (the gaze angle is 10 degrees), in accordance with an embodiment.

The principle is verified by ray trace and experiment. FIG. 5 depicts a ray trace diagram of gaze gracing optics. A DMD 18 is illuminated by an IR source 40 and corresponding pixels are turned on by the servo loop depicted in FIG. 4(C). The gaze angle is 10 degrees. Focal length of the IR-HOE lenses 30, and projection lenses 22 are 10 mm, and 5 mm, respectively. Between the IR-HOE lenses 30, holographic waveguide (FIG. 3(A)) is placed but not shown in FIG. 5.

Figure 6B:
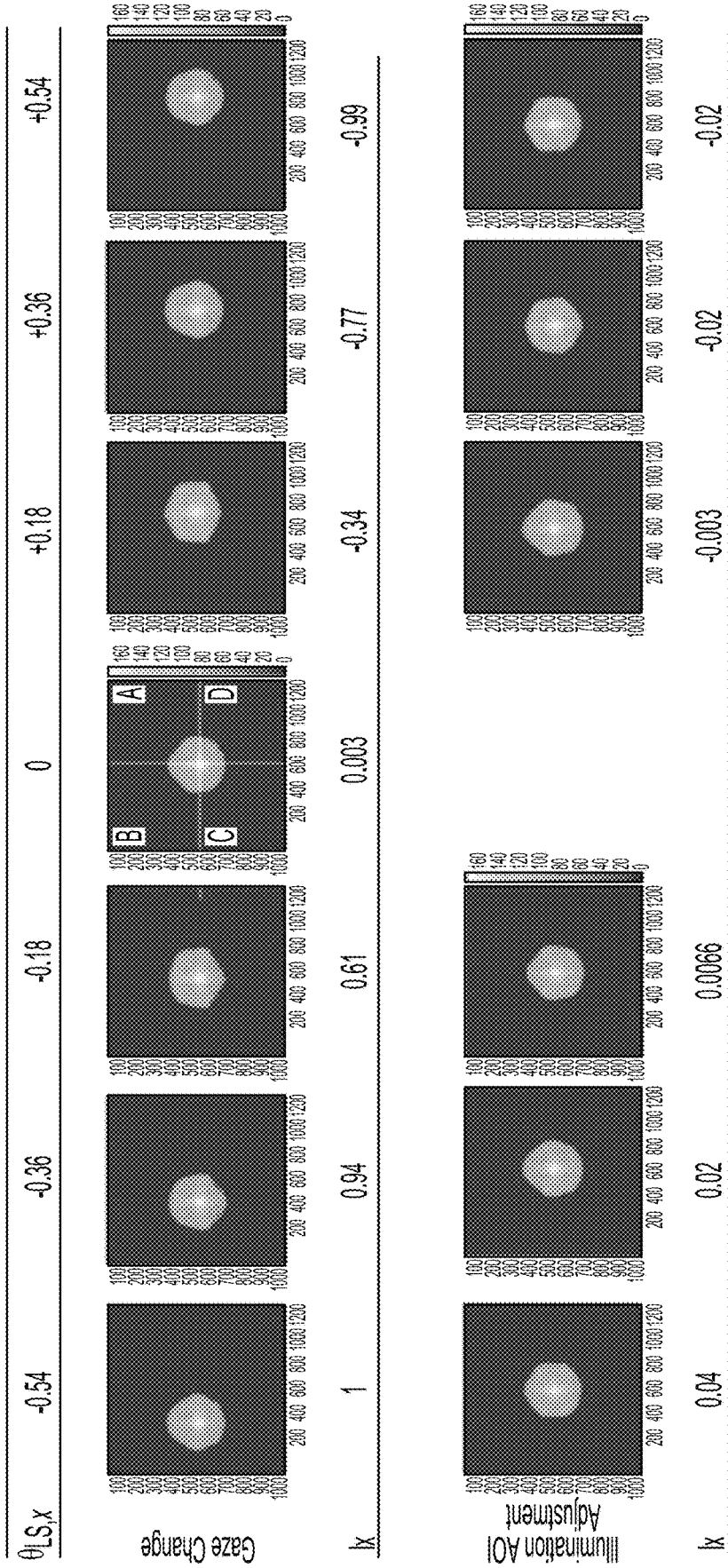
FIG. 6(B) Purkinje image for gaze change $\theta_{LS,y}=-10.62°\sim+10.62°$ Blue region indicates integration area of image corresponding to quad detector segments A, B, C, and D. an experimental proof of the concept, in accordance with an embodiment. (Due to the finite aperture of the lens, Purkinje images at larger $\theta_{LS,y}$ is clipped), in accordance with an embodiment.
Figure 6C:
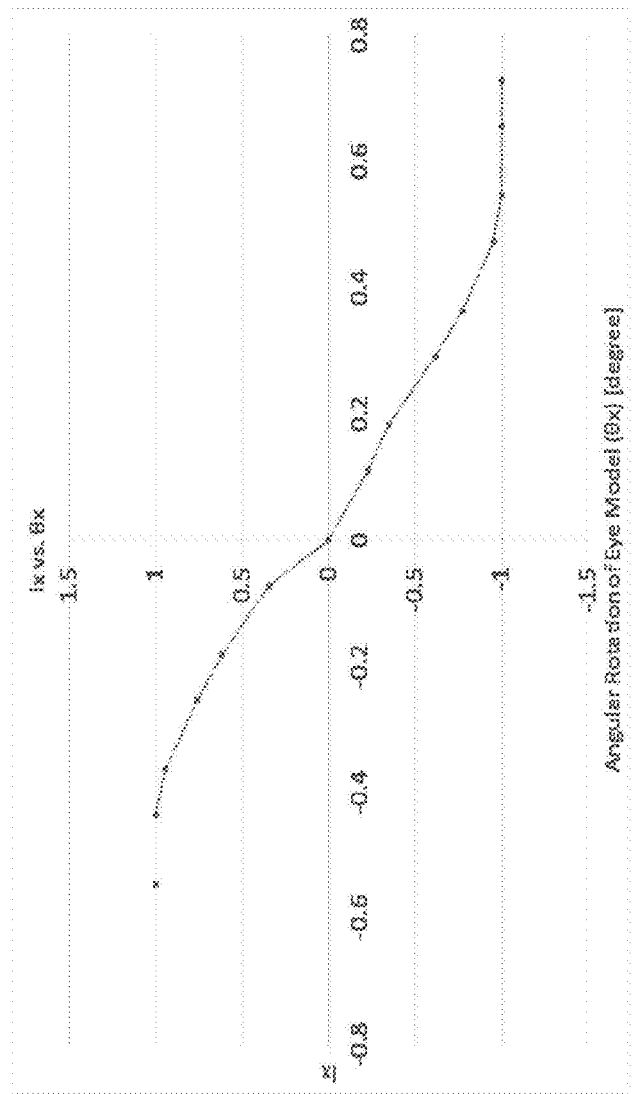
FIG. 6(C) shows experimentally obtained feedback signal $I_y$, °, in accordance with an embodiment.

FIG. 6(A) shows an experimental proof of the concept. A spherical lens with a radius of curvature 7.5 mm as a simulated surface of cornea 26. The lens is illuminated by a 532 nm collimated laser in normal incidence to the surface. A complementary metal-oxide-semiconductor CMOS camera is placed at the location of the quad detector 34. The lens is mounted on a tilt stage and rotated around a pivot point, 13 mm. FIG. 6(B) shows series of Purkinje images for gaze change $\theta_{LS,y}=-10.62°\sim+10.62°$. Pixel intensity of the images is integrated over the areas A, B, C and D and feedback signal $I_y$ is calculated and depicted in FIG. 6(C).

The feedback signal $I_y$ has a good linearity up to gaze angle $\theta_{LS,y}$~8°. The detection range is limited to 10 degrees for the system due to a small clear aperture of the lens used for the experiment. FIG. 7 shows the effect of change of angle of incidence of illumination. Instead of employing DMD 18 and projection lens to change the AOI of the illumination, the AOI of illumination beam is manually adjusted for $\theta_{LS,y}$=−3.56° so that feedback signal $I_y$=0. This can show the feasibility of the gaze servo system.

Dual use of Digital Micromirror Device (DMD) for Image Projection and Gaze Tracking A distinct differentiation of the proposed approach from the state-of-the-art is dual use of a micro-display device for image projection and gaze tracking. A DMD is a Micro Electro Mechanical System (MEMS) based display device. An array of micro mirrors is individually turned on and off in a synchronous manner to light sources (RGB light emitting diodes). A color image is generated by a Pulse Width Modulation (PWM) of micro mirrors of DMD 18. In addition to RGB LEDs, an IR LED is incorporated in the PWM sequence as depicted in FIG. 6(A). Consider that single frame takes 1/60 sec. Within the time period, RGB LEDs are modulated in a synchronous manner to the micro mirror movement. The 1/60 sec interval is divided into sub frames (1/600 sec for 10 sub frames). In the sub frame the IR illumination pattern is inserted. The pixel pattern is determined based on the signals from quad detector 34 $I_x$, and $I_y$ with DMD controller (FIG. 4(C)). The IR illumination angle ($\theta_{ILM,x}\theta_{ILM,y}$) are given by ($\theta_{ILM,x}$=atan(px/f), $\theta_{ILM,y}$=atan(py/f)), where (px, py) denotes position of on pixels of DMD 18, and f is focal length of projections lens. The binary frame rate of micro mirrors is over 23 kHz as reported. The fast switching of mirrors enables inserting extra images to control the angle of incidence of IR illumination. Within 1 frame (1/60 sec), DMD mirror can turn on and off (round trip) for approximately 190 times for 23 kHz frame rate. If 10 frames are allocated for the gaze pattern generation while rest of the 180 frames for image. In this way, the gaze tracking rate of 0.6 kHz (600 fps) is achievable with 5.5% of an overhead for image projection while displaying images onto the retina.

Figure 8:
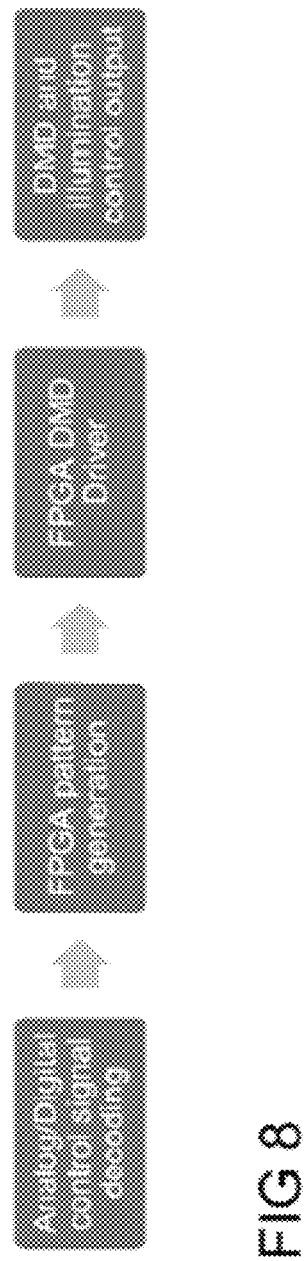
FIG. 8 is a block diagram of DMD and illumination control, in accordance with an embodiment.

With the current available conventional DLP systems, such as the DLP4100 paired with the DLP7000, rates up to 42 KHz are achieved with reduced vertical resolution or 24 KHz with full resolution. For a dynamic DMD IR source a system as shown in FIG. 7 and controlled by block diagram depicted in FIG. 8 is needed. The system can be condensed in to one application FPGA (Field Programmable Gate Array) which runs at 40 Mhz, which has enough clock cycles to be able to dynamically change the illumination within the mechanically limited refresh rate of commercially available DMDs. The whole process starts with an input decoder, either an ADC for analog DC/AC voltage signals or an LVCOMS input. Then by dynamically building the illumination pattern the illumination can be changed on the fly, on demand, with no predefined sequence order. Control over single rows in the whole pattern is achieved, meaning that if the eye tracking calls for one row of the illumination to update, the response time can be reduced by only updating that row.

Scalability of the Proposed Gaze Tracking Method

While proof of the concept of the gaze tracking method is critical, it is also important to determine the scalability of the approach. Implementation of the system to AR glass and recovery algorithm for the gaze tracking system from blinking of the eye is addressed.

Extension of FOV for Gaze Tracking

As demand for Field of View (FOV) increases, the demand for the FOV of gaze tracking also increases. The proposed gaze tracking system detects the Purkinje image from the first surface of the cornea. The full detectable range of the gaze angle is upper limited by $\theta_{LS}$=2 tan((D−d)/2L) ~44 deg in full FOV where D=11.5 mm (diameter of cornea), d=1 mm (illumination beam diameter), and L=13 mm (distance between the center of eye rotation and the surface of the cornea). The FOV of gaze tracking is matched to the current FOV of AR device 40 degrees. Another limiting factor is size of the optics. As FIG. 5 shows, the clear aperture of optics is about 6 mm for 20 degrees gaze tracking. For a 40-degree gaze tracking, the clear aperture size is estimated at about 12 mm which still is a reasonable size. Although the FOV of the proposed gaze tracking method is comparable to FOV of AR devices, even wider FOV would be needed for AR devices in the future as well as for the a foveated VR devices. The most straight forward approach to extend FOV is two gaze tracking devices to split the FOV for example 45 degrees each to achieve 90 degrees gaze tracking FOV. For an AR display, this would be a reasonable approach since a holographic waveguide can only accommodate up to 60 degrees of display FOV for n=2.0 material. In principle, the display FOV and Gaze FOV is limited by material of the holographic waveguide.

On the other hand, the optical architecture for VR gaze tracking would be different. A recently published paper by the present inventors for DMD display on diffraction based FOV extension. The application of the method for wide FOV gaze tracking for AR and VR application will be researched as a ray trace model.

Recovery from Blinking Search Algorithm

One of the challenges in gaze tracking is blinking of the eye, and variation of gaze angle before and after the blink. Since the servo signal is not available during the blinking, alternative information is needed to restart gaze tracking. The gaze search algorithm is tested by digitally controlled illumination with a DMD 18. Once servo signal is lost, the display sequence depicted in FIG. 6(B) is suspended, and the system is switched to a gaze search mode. In the search mode, DMD pattern is synchronized to IR source such that the angle of IR illumination scans entire FOV, such as $|(\theta_{LS,x}\theta_{LS,y})|$<FOV, of the gaze tracking while monitoring signal from quad detector 34 $I_s$=(A+B)+(C+D). Once the signal $I_s$ was detected, fine tuning of the AOI of illumination is done so that the condition A~B~C~D is satisfied.

Alternatively, a focused illumination and detection by quad detector or position sensitive detector is employed. The configuration is an open loop gaze tracking that eliminates needs of using DMD as a part of illumination optical path.

Figure 9:
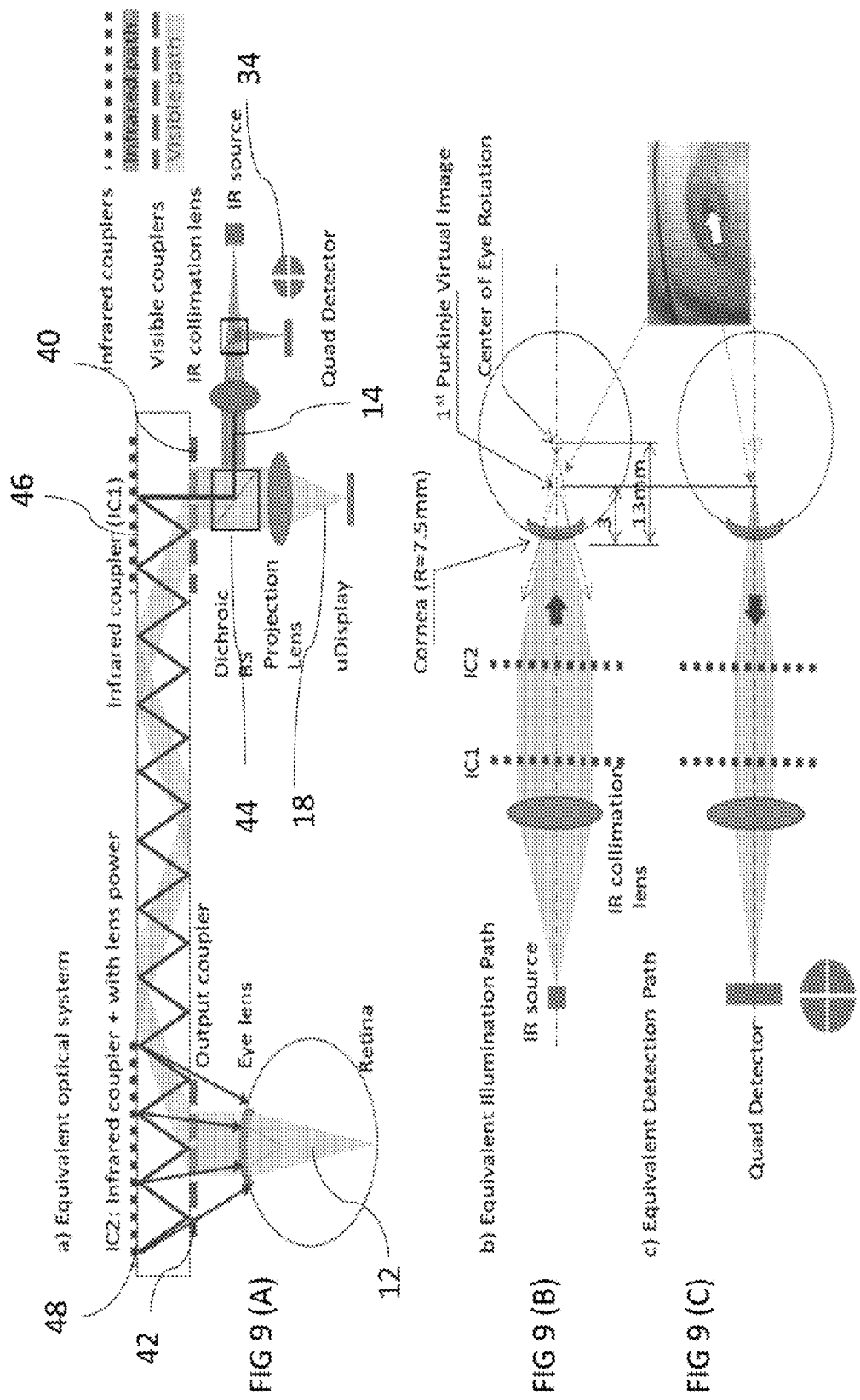
FIG. 9(A) is a schematic diagram of a gaze tracking system employing focused illumination and quad detector or position sensitive detector.
FIG. 9(B) is a schematic of illumination, in accordance with an embodiment.
FIG. 9(C) is a schematic of detection optical train, in accordance with an embodiment.

FIG. 9 depicts a cross sectional schematic of Near-to-Eye Display (NED) with proposed Gaze tracking system. There are two optical paths (Green for displaying projected information, Red for illuminating cornea). An image of the micro display is projected at infinity and is coupled to total internal reflection (TIR) mode of the image guide via visible input coupler (VC1). After propagation inside the image guide, a visible output coupler (VC2) couples light into air. Eye forms an image of display through eye lenses (air-cornea interface). The image guide optical path is shared with an infrared optical path. IR source is collimated by an IR collimation lens. The Dichroic beam splitter (BS) align the IR light to visible light. The IR light is coupled to TIR mode via an infrared coupler (IC1). Note that the VC1 has negligible effect on IR light due to the difference of wavelength. IC2 is a coupler that has a refractive power and forms a converging IR illumination towards center of eye rotation.

The focuses IR light towards center of eye rotation (14 mm measured from surface of cornea) is reflected and generates virtual image (Purkinje image) at about 3 mm away from the surface of the cornea. FIG. 3C shows an optical path to detect the transverse position of Purkinje Image. The reflected light is coupled into TIR mode by IC2 and out coupled to air by IC1. The dichroic beam splitter and a beam splitter placed between the IR source and IR collimating lens directs the signal towards quadrant detector. The optical configuration, images Purkinje image to the IR-quad detector.

Figure 10:
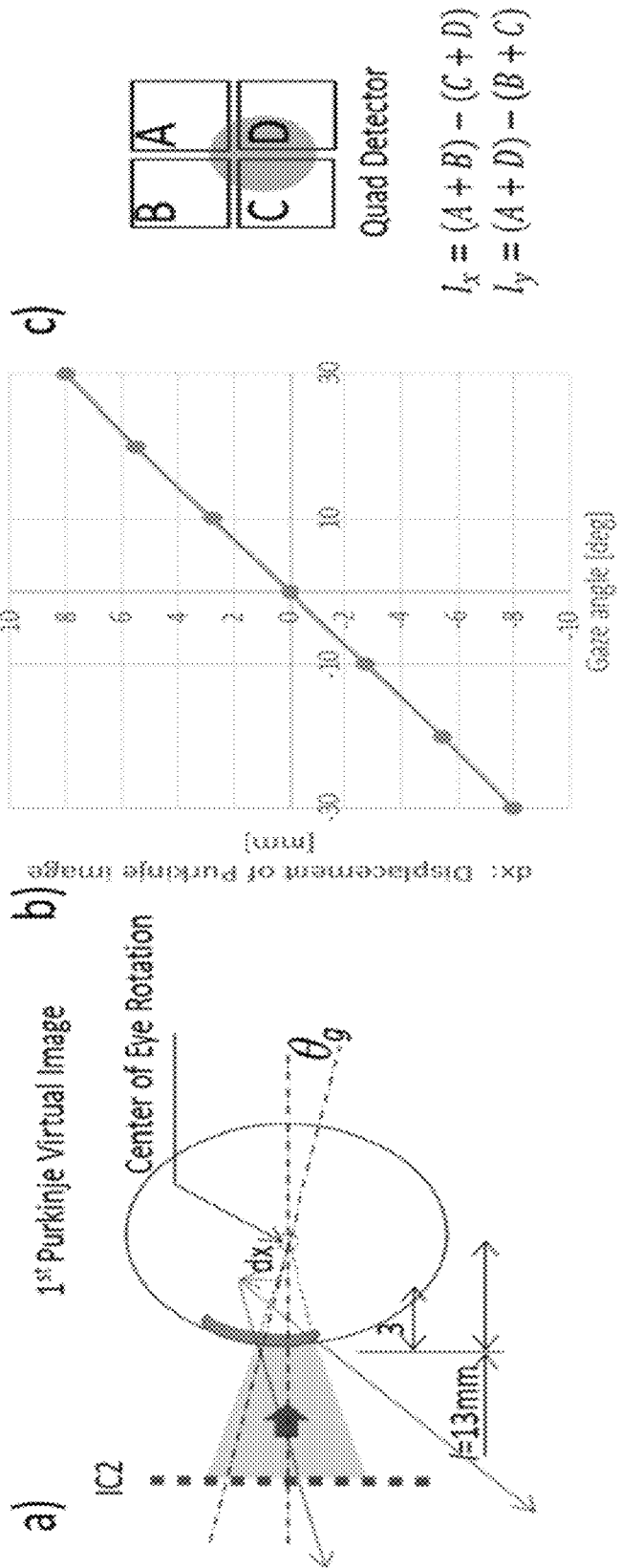
FIG. 10(A) is a schematic of an operation principle of a gaze tracking system employing focused illumination and quad detector or position sensitive detector described in FIG. 9.
FIG. 10(B) is a graph of displacement of Purkinje image dx as a function change of gaze.
FIG. 10(C) is schematic is of a spot of Purkinje image on a quad detector.

The displacement of Purkinje image (dx, dy, dz) occurs as gaze changes in horizontal (y-direction), vertical (x-direction) as well as along optical axis (z-direction). FIG. 10a shows how Purkinje image shifts as gaze changes. The displacement of Purkinje image dx as a function change of gaze $\theta_g$ is plotted in FIG. 10b, and is given by $$dx = (1+m)l\sin(\theta_g) = \left\{\left(\frac{R}{2}\right)\left(\frac{R}{2}+l\right)\right\}l\sin(\theta_g),$$

where m is a magnification of Purkinje image, R is radius if the cornea 7.5 mm, l is the position of focal point by the IC2 measured from the surface of cornea, which is 13 mm. The Purkinje image lineary shifts with $\theta_g$. Accordingly on the quad detector, position of Purkinje image shifts (FIG. 10c). The shift of Purkinje and varies the signal of quad detector, $I_x=(A+B)-(C+D)$, and $I_y=(A+D)-(B+C)$. The signal $I_x$ and $I_y$ indicates the amount and direction shift of light of sight in vertical and horizontal directions, respectively.

Figures 11, 11B:
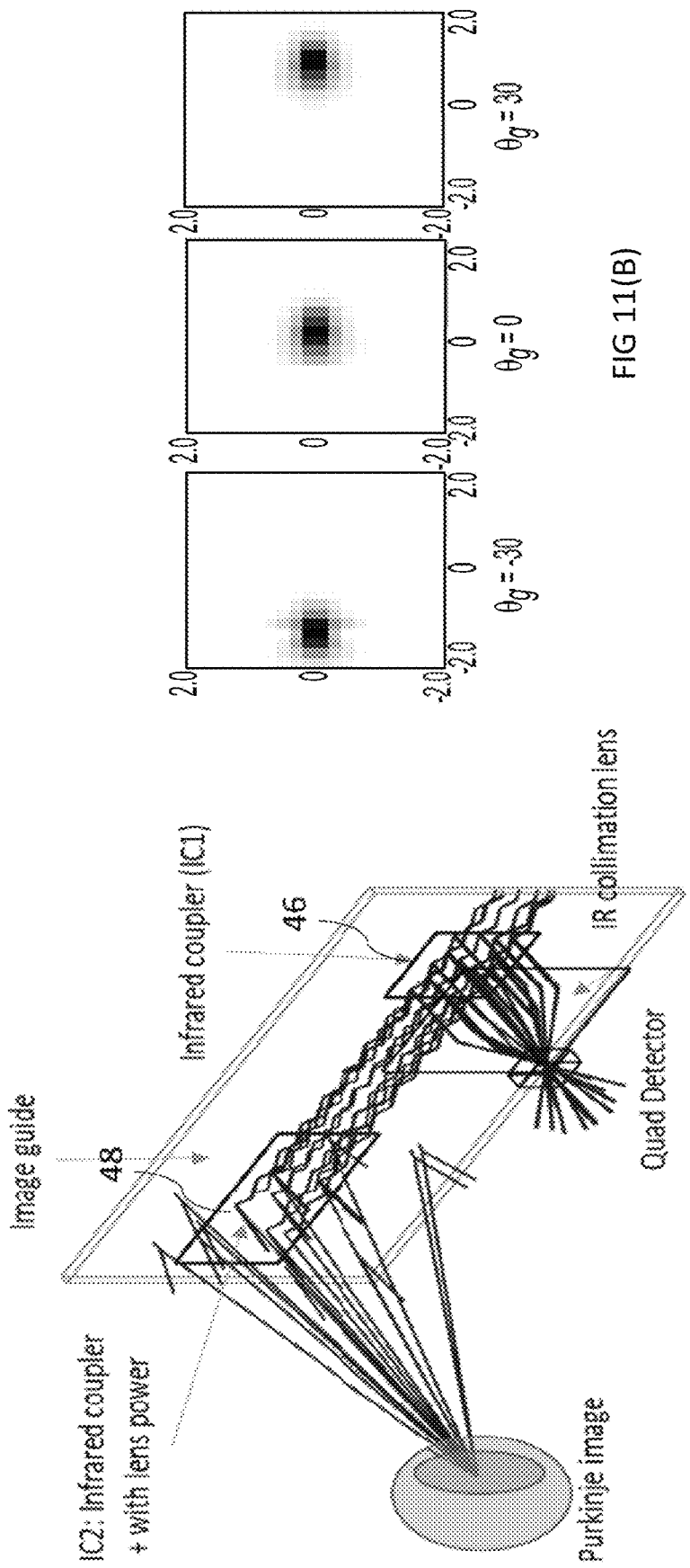
FIG. 11(B) are charts showing quad detector output for $\theta_g=+30$.

The gaze tracking operation is confirmed by a ray trace modeling (FIG. 11a). In the ray trace model, the cornea is modeled as a curved and reflective surface. Ray is back traced from the Purkinje image to IC2 infrared coupler, TIR image guide, IC1 and IR collimating lens. The decenter of the cornea surface was changed for +/−8 mm corresponding to the gaze angle change $\theta_g$=+/−30 degrees. FIG. 5b shows detector output for $\theta_g$=+30, 0, and −30 degrees. Within 2 mm of diameter, the spot is captured. Note that in actual system, light shaping diffuser or other diffusers is added to expand the beam so that spot is covered by all the quadrant of detector.

The fundamental advantage of the proposed gaze tracking approach is that angular bandwidth (FOV) required for the gaze tracking, both for illumination and gaze detection are substantially small as compared to the angular bandwidth of the image guide. To achieve +/−30 degree gaze tracking, only +/−13 degrees of FOV is needed for IR path with $f_{IC2}$=35 mm coupler for detection of the shift of Purkinje image. For illumination, "fixed" and converging illumination requires close to zero TIR bandwidth. The IR bandwidth requirement is within the display bandwidth of single layer image guide with n=1.5, +/−14 degrees. Current advance in high index glass/polymer substrates allow high index image guide, n=1.7 has +/−20 degrees which easily supports +/−13 degree bandwidth for gaze tracking. Besides, Analog gaze tracking with single quad detector has advantages in speed, cost, size, and computational power, and therefore power consumption as compared to camera based approach. Also the converging illumination that overfill the region of the cornea makes this approach robust to interference with eye lid, eye lash, recovery from blinking as discussed in later section. Moreover, the approach is prescription eye glasses ready that potentially increase adoption of gaze tracking considering that 50% of population owns eye-ware.

While various embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings are used. Those skilled in the art will recognize or be able to ascertain using no more than routine experimentation, many equivalents to the specific embodiments described herein. It is, therefore, to be understood that the foregoing embodiments are presented by way of example only and that, within the scope of the appended claims and equivalents thereto, embodiments may be practiced otherwise than as specifically described and claimed. Embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

The above-described embodiments of the described subject matter can be implemented in any of numerous ways. For example, some embodiments may be implemented using hardware, software or a combination thereof. When any aspect of an embodiment is implemented at least in part in software, the software code can be executed on any suitable processor or collection of processors, whether provided in a single device or computer or distributed among multiple devices/computers.

What is claimed is:

1. A process having steps for image projection and gaze tracking, the steps comprising: a. illuminating a digital micromirror device via a light source, wherein the digital micromirror device is a micro electro mechanical system having an array of micro mirrors;
   b. turning on and off the micro mirrors in a synchronous manner to the light source;
   c. forming a visible image by pulse width modulation of the micro mirrors,
   d. incorporating an infrared light emitting diode into the pulse width modulation
   e. generating an infrared illuminating beam using the digital micromirror device, the infrared illuminating beam having a modulated angle;
   f. reflecting the infrared illuminating beam off of a user's cornea;
   g. tracking a user's gaze by detecting the reflection of the infrared illuminating beam off of the user's cornea using a quad detector;
   h. providing a feedback signal to the digital micromirror device, wherein the feedback signal represents the overall variation of the user's gaze;

i. adjusting the angle of the infrared illuminating beam based upon the feedback signal;

j. integrating a feedback servo signal over a time; and k. time-multiplexing the infrared illuminating beam.

2. The process of claim 1, wherein the light source is a red green blue light emitting diode.

3. The process of claim 1, further comprising the step of: combining the visible and infrared light using a dichroic beam splitter.

4. The process of claim 1, further comprising the step of: in and out-coupling the visible image using a holographic optical element coupler.

5. The process of claim 1, wherein the micro mirrors can turn on and off approximately 190 times within 1/60 sec for 23 kHz frame rate.

6. The process of claim 1, IR light source is collimated by a projection lens with holographic chromatic corrector that corrects the difference of focal length between visible and IR light.

7. The process of claim 1, further comprising the step of: relaying the reflection of the infrared illuminating beam to the quad detector using at least one infrared holographic optical element lens.

8. A digital illumination assisted gaze tracking for augmented reality near to eye display device, comprising:

a digital micromirror device having a controller, wherein the digital micromirror device is a micro electro mechanical system having an array of micro mirrors and pixels;

an illumination beam generated by the digital micromirror device along an optical path, having an angle of incidence;

a quad detector being in communication with the digital micromirror device and positioned along the optical path such that it can receive a reflected illumination beam having a gaze angle; and a servomechanism controller in communication with the digital micromirror device controller, such that a feedback loop is formed wherein a signal is produced by the quad detector is sent to the digital micromirror device, wherein the digital micromirror device controller adjusts the angle of incidence based upon the feedback loop, integrates the feedback, integrates the feedback signal over time, and time-multiplexes the illuminating beam.

9. The device of claim 8, wherein the digital micromirror device generates a visible image.

10. The device of claim 8, further comprising a projection lens with holographic chromatic corrector along the optical path.

11. The device of claim 8, further comprising a holographic optical element along the optical path.

12. The device of claim 8, further comprising light emitting diode positioned to illuminate the digital micromirror device.

13. The device of claim 8, further comprising an infrared light source positioned to illuminate the digital micromirror device.

14. The device of claim 13, further comprising a dichroic beam splitter positioned between the infrared light source and the digital micromirror device.

* * * * *